(12) United States Patent
Asum

(10) Patent No.: US 11,324,576 B2
(45) Date of Patent: May 10, 2022

(54) SUCTION DEVICE

(71) Applicant: Ivoclar Vivadent AG, Schaan (LI)

(72) Inventor: Thomas Asum, Gothenburg (SE)

(73) Assignee: Ivoclar Vivadent AG, Schaan (LI)

( * ) Notice: Subject to any disclaimer, the term of this patent is extended or adjusted under 35 U.S.C. 154(b) by 97 days.

(21) Appl. No.: 16/985,390

(22) Filed: Aug. 5, 2020

(65) Prior Publication Data
US 2021/0038354 A1 Feb. 11, 2021

(30) Foreign Application Priority Data
Aug. 8, 2019 (EP) .................................... 19190635

(51) Int. Cl.
*A61C 17/06* (2006.01)
*A61C 17/08* (2006.01)

(52) U.S. Cl.
CPC ............ *A61C 17/092* (2019.05); *A61C 17/08* (2019.05)

(58) Field of Classification Search
CPC ................................................ A61C 17/04–14
USPC .......................................................... 433/93
See application file for complete search history.

(56) References Cited

U.S. PATENT DOCUMENTS

| | | | |
|---|---|---|---|
| 1,742,080 A | 12/1929 | Jones | |
| 2,507,938 A * | 5/1950 | Smith ................... | A61C 19/001 433/94 |
| 3,758,950 A * | 9/1973 | Krouzian ............... | A61C 17/08 433/91 |
| 4,233,025 A * | 11/1980 | Larson ................ | A61F 13/2071 433/136 |
| 4,259,067 A * | 3/1981 | Nelson .................... | A61C 17/08 433/93 |
| 5,071,347 A * | 12/1991 | McGuire ................ | A61C 17/08 433/91 |
| 5,094,616 A * | 3/1992 | Levenson .............. | A61C 17/08 433/93 |
| 5,203,699 A * | 4/1993 | McGuire ................ | A61C 17/08 433/93 |
| 5,279,599 A * | 1/1994 | Wilk ..................... | B08B 15/007 604/317 |
| 5,924,866 A * | 7/1999 | Eldreth .................. | A61C 17/08 433/140 |
| 6,068,477 A * | 5/2000 | Mahlmann .............. | A61M 1/84 433/96 |

(Continued)

FOREIGN PATENT DOCUMENTS

| | | |
|---|---|---|
| DE | 2120707 A1 | 11/1972 |
| EP | 3260081 A1 | 12/2017 |

*Primary Examiner* — Matthew M Nelson
(74) *Attorney, Agent, or Firm* — Ann M. Knab; Thad McMurray

(57) ABSTRACT

The invention relates to a suction device for intraoral use, comprising a suction line and a tongue protection, said suction line being bent substantially U-shaped, which are configured by a molded part, in particular integrally with one another. The suction tube comprises a connection which points mesially for a suction hose. In the course of the suction tube the connection is adjoined by an upper U-leg, a mesial U-central portion and a lower U-leg, said legs extending distally from the U-central portion. The lower U-leg comprises suction openings and is surrounded by a suction sponge which covers the suction openings. The suction tube terminates at the distal end of the lower U-leg in an end suction opening which is covered by the suction sponge.

20 Claims, 4 Drawing Sheets

(56) References Cited

U.S. PATENT DOCUMENTS

| | | | | |
|---|---|---|---|---|
| 6,309,218 | B1* | 10/2001 | Ellenbecker | A61C 17/08 433/93 |
| 6,736,640 | B1* | 5/2004 | Ellenbecker | A61C 17/08 433/93 |
| 2006/0008764 | A1* | 1/2006 | Abo | A61C 17/08 433/95 |
| 2006/0199147 | A1* | 9/2006 | Mahlmann | A61C 17/096 433/96 |
| 2018/0014920 | A1* | 1/2018 | Asum | A61C 5/90 |
| 2018/0193120 | A1* | 7/2018 | Asum | A61F 13/36 |
| 2020/0085551 | A9* | 3/2020 | Asum | A61C 5/90 |
| 2020/0405988 | A1* | 12/2020 | Flint | A61M 16/049 |

\* cited by examiner

SUCTION DEVICE

CROSS-REFERENCE TO RELATED APPLICATIONS

This application claims priority to European patent application No. 19190635.3 filed on Aug. 8, 2019, the disclosure of which is incorporated herein by reference in its entirety.

TECHNICAL FIELD

The invention relates to a suction device for intraoral use.

BACKGROUND

Suction devices of this type have been known for a long time, e.g. from U.S. Pat. Nos. 5,071,347 A1 and 6,309,218 A1, but also from U.S. Pat. No. 1,742,080 A1, all of which are incorporated by reference in their entirety.

By contrast, a more recent solution according to commonly owned, copending EP 3 260 081 A1 and corresponding US 20180014920, US 20180193120 and US 20200085551, which US publications are hereby incorporated by reference, provide an improvement. In this solution, a suction hose whose end is covered by a sponge-like absorption body is bent in a U-shaped manner. This serves to cover the entire intraoral region orally to the lower alveolar ridge and to suck off saliva collecting thereat.

A tongue protection can be attached to the absorption body which tongue protection extends from the absorption body to the top.

A certain disadvantage of this solution is that it requires careful adaption to the anatomy of the patient to be effective. This means that the intraoral space is different for different patients, in particular comprises a varying width. When the U-shaped absorption body is set to be too broad with its two legs adjacent to one another, it is squeezed almost automatically by the expansion to the occlusal side, i.e. to the top. Then, it cannot abut on the deepest position and the suction performance is unsatisfactory.

As an adaption is necessary, both the suction hose and the absorption body are elastic and do not take on any defined state.

SUMMARY OF THE INVENTION

Contrary to this, the invention is based on the task of providing an improved suction device according to the claims, which is safe to use even with different mouth situations and provides proper suction performance at the position relevant for treatment.

This task is inventively solved by claim 1. Advantageous developments may be taken from the subclaims.

According to the invention, it is provided that the suction device intended for intraoral use is provided with a special molded part. The molded part is connected to a suction hose and intended to extend from the alveolar ridge unilaterally to the bottom to the lowest point in the mouth of the patient in the intraoral region.

The molded part comprises a suction tube bent into a U shape. In this case, the U has a vertical axis of extension, contrary to prior art.

In the dentist's chair the patient is usually in a lying or almost lying position during the treatment. This means that the lowest intraoral position is in the distal region of the mouth cavity. According to the invention, this is exactly where the end suction opening of the lower U-leg of the suction tube is provided such that intensive suction is performed thereat.

According to the invention, the molded part forms both the suction tube and the tongue protection. The U-shaped extension produces a certain vertical height as a result of which the tongue of the patient pushes the molded part with the end suction opening automatically towards the bottom. This is not uncomfortable for the patient as the inventive suction sponge is provided thereat in such a way that the lower U-leg is covered completely and voluminously but elastically by the suction sponge.

Both the lower U-leg and the upper U-leg of the suction tube extend below or at least obliquely below the tongue of the patient. However, the tongue protection extends from the upper U-leg to the top. In a way known per se, it is flat in the manner of a platelet and preferably comprises roundings and smooth surfaces, or if necessary also a shell from an elastic material which is anchored with the molded part preferably in injection molding.

The U shape of the suction tube offers the additional advantage that the suction sponge may be anchored reliably. It can be mounted without adhesive by being pulled upon the lower U-leg. Retaining mandrels which extend from the upper U-leg to the bottom and penetrate into the suction sponge hold the suction sponge reliably against slipping off.

The transition between suction tube and suction hose may also be realized without adhesive. For this purpose, the suction hose is either pressed into the suction tube or the molded part is configured in two parts, and clipping together the parts of the molded part clamps the suction hose. It is particularly advantageous when the unit, i.e. the suction tube and the suction hose, is subsequently welded together by means of high frequency or another method.

It is to be understood that the molded part consists of a substantially harder plastic than the suction hose and all the more than the suction sponge. For instance, examples include, but are not limited to, polyethylene (PE), polypropylene (PP), polyamide (nylon) (PA) or acrylonitrile-butadiene-styrene (ABS) or of any other material which is suitable for injection molding.

In contrast, the suction sponge may be fabricated of a softer material, such as, but not limited to an elastomer or if applicable of a natural sponge material. Examples of materials for the suction hose include, but are not limited to, soft PE or polyvinyl chloride (PVC).

To maintain a defined guidance of the suction hose, it is preferred to have a stiffening element, such as a shape-holding wire, incorporated in or running through the suction hose which is adaptable and bendable corresponding to the patient's biometrics. Then, the shape-holding wire terminates in the suction tube of the molded part such that injuries to the patient by a protruding shape-holding wire are excluded reliably. The shape-holding wire may be any suitable, i.e. biocompatible, material, such as, but not limited to, stainless steel or titanium. It is also possible to apply a coating made of plastic to the shape-holding wire made of cost-effective light metal.

It must be ensured by suitable measures that no electrolytic reactions with metallic implants or other dental restorations take place.

Based on the shaping by the shape-holding wire, the suction hose then runs from the mesial connection of the molded part in an arc to the top, i.e. intraorally to the alveolar ridge, and runs preferably behind the rearmost molar over the alveolar ridge to the vestibular side.

In the vestibular region it is bent again such that the suction hose extends therefrom to the mesial side and leaves the mouth.

In this respect, the shape-holding wire comprises a bend starting from the connection substantially at right angles, then runs beyond the alveolar ridge in a U-shaped arc which is 1 to 2 cm broad and which is open towards the bottom, and then an angular deflection extends vestibularly in turn by approximately 90° to the mesial direction.

In this connection, "approximately 90°" refers to ranges between approximately 70° and 110°.

According to the invention it is provided advantageously that suction openings are only configured in the lower U-leg of the molded part. The available suction performance is thus concentrated to the region in which a liquid may be sucked off effectively. In this connection, the suction opening which is closest to the U central region is smallest. Preferably, the end suction opening is largest.

It is possible to configure the suction openings pointing to the top, i.e. to the upper U-leg, with a smaller diameter, and to configure the suction openings arranged mesially and at the bottom, i.e. close to the gingiva, with a comparatively large or larger diameter in any case.

Preferably, the sum of the cross-sectional areas of the suction openings is larger than the internal diameter of the suction tube. In this way, a comparatively small flow speed of the liquid in the distal lower region of the U-leg is achieved.

Preferably, the suction tube in the upper U-leg is expanded towards the connection. In this way, it is possible to give a major share of the suction hose substantially the same flow area as the suction tube.

It is necessary that the molded part is made up of two parts for mass production, e.g. by injection molding, which may be realized e.g. by means of a film hinge which connects halves of the molded part with one another integrally and which is configured at the bottom of the lower U-leg. Then, both halves can be folded up and can be snapped in with one another preferably by means of suitable elements, such as corresponding snap-fits, mushroom-shaped dowel pins or snap-in pins and corresponding counter-recesses, e.g. catch recesses, as anchoring element. In this way, the end of the suction hose is then also clamped at the connection.

Alternatively, only the region of the connection is configured in two parts such that the molded part consists of a substantially larger part and a smaller connection part.

The suction sponge may have any suitable shape, such as a circular ring-shaped cross section or a trapezoidal cross section. The wider-meshed or more open-pored the sponge is, the more permeable it is, i.e. smaller particles can reach the suction tube more easily; the finer-meshed or more narrow-pored, the more absorbent it is.

Its wall thickness can amount to between 2 and 10 mm and amounts preferably to approximately 4 to 5 mm. It is to be understood that an open-pored sponge with fine pores having a pore diameter of less than 1 mm is preferred. The suction hose is clamped in fixedly at the connection by the pressing effect of the parts of the molded part to each other. This also ensures an anti-rotation protection of the suction hose with respect to the molded part, and at the same time an extraction protection.

If necessary, the tongue protection may be provided with an embossed area to identify the inventive suction device. The embossed area may be configured to penetrate the other part of the two-piece molded part and to produce a flush surface of the two parts thereat.

The U shape of the suction tube is configured such that the U is comparatively narrow. For instance, the distance between the legs may amount to 6 to 12 mm and preferably approximately to 9 mm. The length of each leg may amount to between 2 and 5 mm and preferably approximately to 3.5 mm. This configuration prevents the lower U-leg to press onto the gingiva too strongly by the movement of the tongue and the effect of the tongue protection such that the gingiva is not put under too much pressure at the oral side inventively.

In a preferred configuration the lower U-leg is slightly longer, e.g. longer by 1 cm, than the upper U-leg up to the connection. In this way, the lower U-leg with the end suction opening is pressed reliably to the lowest position in the mouth cavity intraorally when the patient is in the lying position.

BRIEF DESCRIPTION

Further advantages, details and features may be taken from the following description of several exemplary embodiments of the invention in conjunction with the drawings, in which.

DETAILED DESCRIPTION

Figure 1:
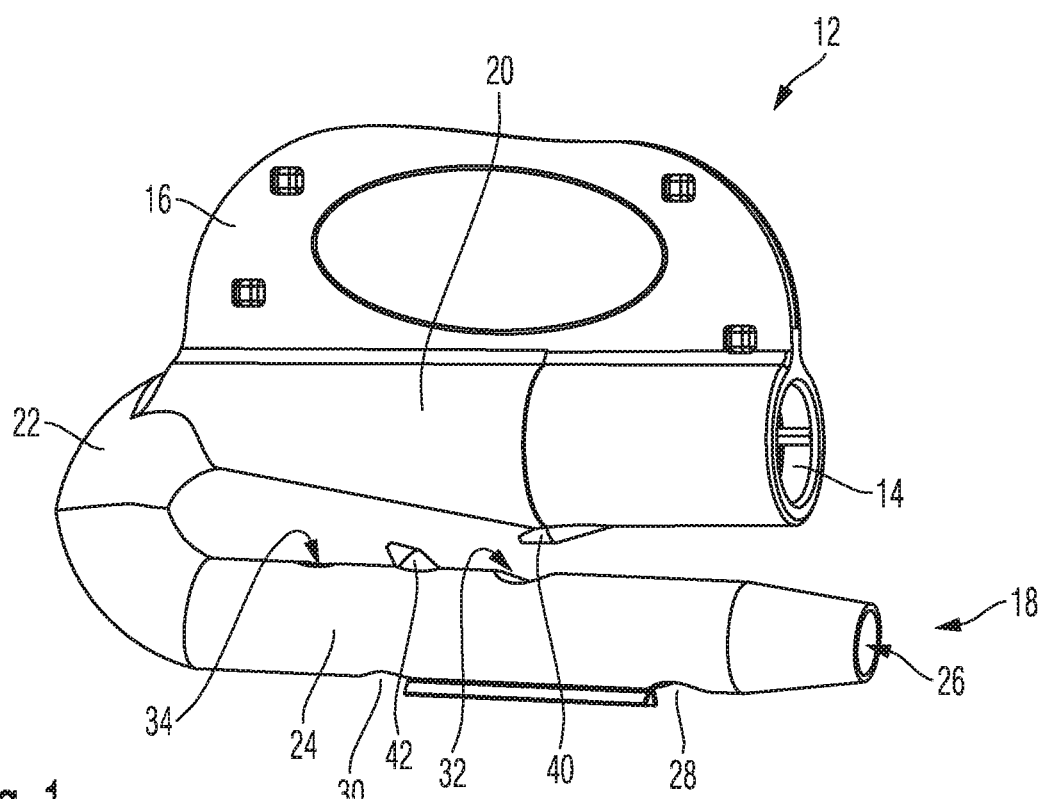
FIG. 1 shows a perspective illustration of a part of the inventive intraoral suction device, namely the molded part in a first embodiment.

In FIG. 1 a part of an embodiment of an inventive suction device 10 is illustrated, namely a molded part 12. The molded part 12 is fabricated preferably of hard plastic and can be produced by injection molding. The suction device 10 comprises, besides the molded part 12 having a tongue protection and a suction line, also a suction hose 84 which is inserted in a connection 14 which is configured in the molded part 12, as well as a suction sponge 80 which is not illustrated in FIG. 1 and surrounds the lower region of the molded part 12.

The molded part 12 itself comprises a tongue protection 16 and a suction tube 18. The suction tube 18 extends from the connection 14 in the manner of a flat and vertically extending U. Accordingly, the molded part 12 and thus the suction tube 18 comprises an upper U-leg 20, a U central portion 22 and a lower U-leg 24.

The suction device 10 is intended for intraoral arrangement. Accordingly, in use the molded part 12 is applied in the interior of the mouth of a patient laterally below the tongue. In this connection, the U central portion 22 extends to the front, i.e. mesially, and the connection 14 to the rear, i.e. distally.

The lower U-leg 24 terminates in an end suction opening 26. Additionally, the lower U-leg 24 comprises further suction openings 28, 30, 32 and 34 some of which extend to the bottom, and some of which to the top.

Close to the end suction opening 26 the suction tube 18 runs slightly conically. Additionally, this conical region of the lower U-leg 24 protrudes further distally than the end of the connection 14 for the suction hose 84.

The molded part 12 additionally comprises two or more retaining mandrels 40 and 42. In the illustrated exemplary embodiment they are arranged such that they face one another laterally at the U-legs 20 and 24 and point towards one another. The retaining mandrels 40 and 42 serve as an extraction protection for the suction sponge 80 not illustrated herein which is pulled upon the lower U-leg 24.

As is apparent from FIG. 1, the entire molded part 12 is rounded and configured mouth-friendly and in particular also in the region of the tongue protection 16. The end suction opening 26 which seems to be sharp-edged is surrounded completely by the soft and elastic suction sponge 80 such that there is no risk of injuries here either.

The U-shaped central portion 22 extends mesially below the tongue and is rounded strongly such that there is no risk of injuries here either.

Figure 2:
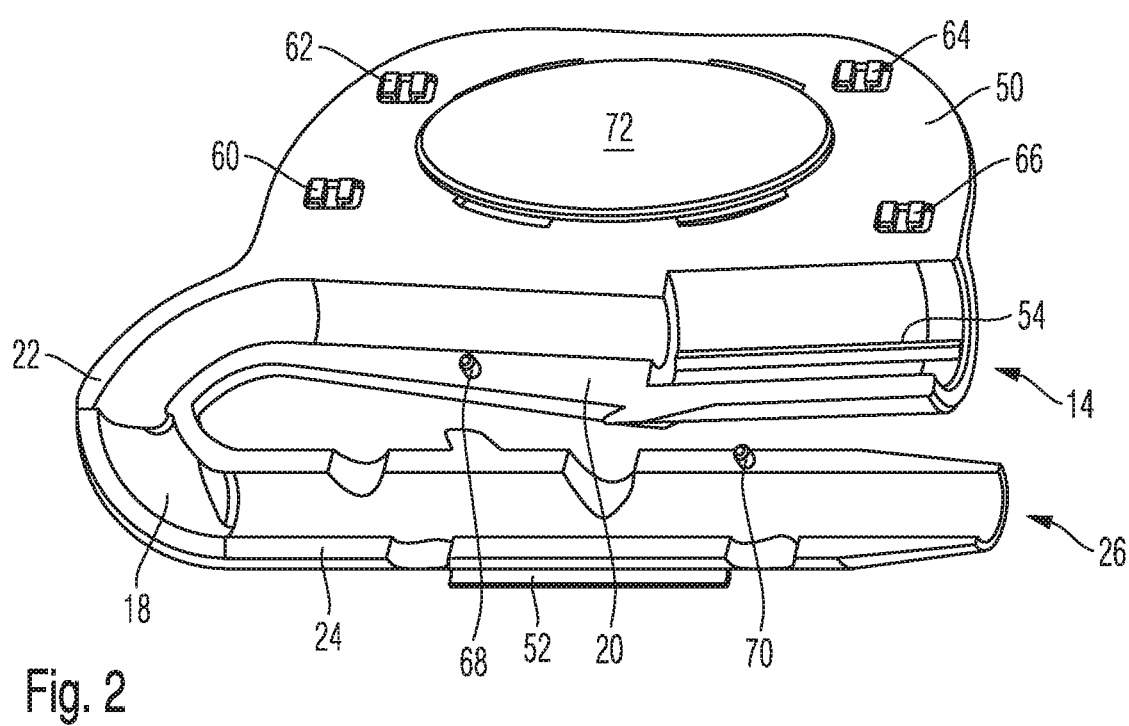
FIG. 2 shows a part of the inventive molded part according to FIG. 1, namely one half of the molded part in the unfolded state.

The embodiment of the inventive suction device 10 according to FIG. 1 in a part 50 is apparent from FIG. 2.

In this exemplary embodiment, the molded part 12 is separable, and in FIG. 2 only a part 50 is apparent. Both parts are connected with one another by means of a film hinge 52. The film hinge 52 extends directly adjacent at the bottom of the lower U-leg 24.

Here, as in the further Figures, the same reference numbers refer to the same or corresponding parts and do not require description again.

As is apparent, the suction tube 18 extends in a U-shaped manner up to the connection 14. The connection 14 has a larger internal diameter than the rest of the suction tube 18. The wall thickness of the hose corresponds to the diameter difference such that on the inside there is a substantially flush transition between the suction tube 18 and the suction hose 84 not illustrated.

Additionally, the connection 14 is provided with at least one rib which protrudes towards the inside and forms an anti-rotation mechanism for the suction hose 84.

Figure 3:
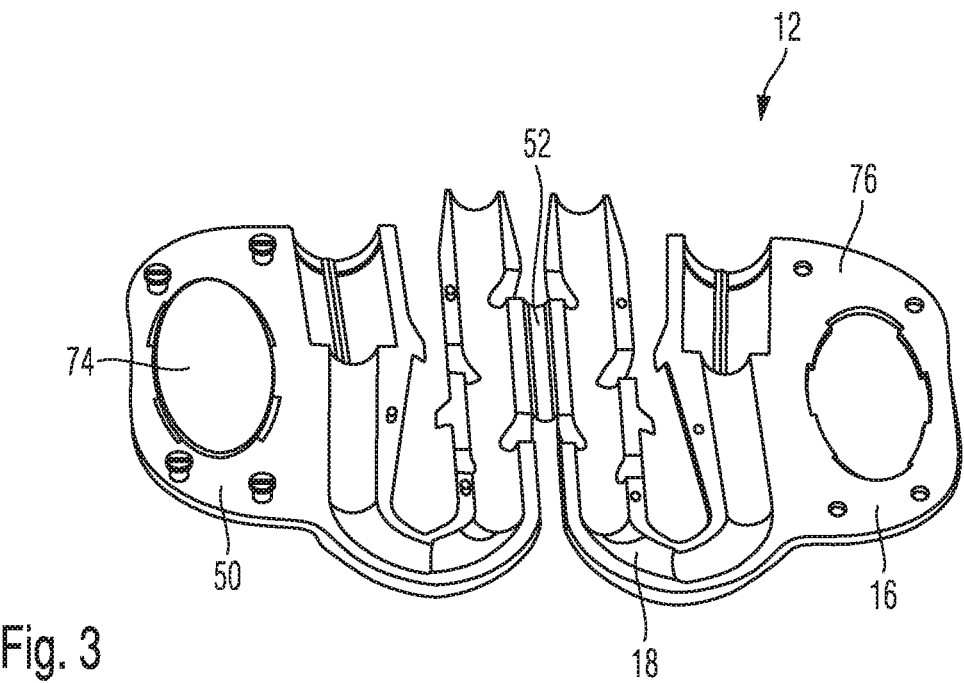
FIG. 3 shows the complete unfolded molded part according to FIG. 2.

As is apparent from FIG. 2, several retaining collars 60, 62, 64, 66, 68 and 70 are provided as anchoring elements for fixing the parts 50 and 76 to each other which snap into a corresponding catch recess in the other part 76 of the molded part 12 illustrated in FIG. 3 and which fix the two parts on top of one another.

An elevated embossing surface 74 is provided which may carry an inscription, for instance, and penetrates a corresponding recess in the other part, namely such that it is flush with the opposite side of the other part such that the tongue protection 16 comprises a smooth and flush surface altogether.

The molded part 12 with the two parts 50 and 76 is apparent from FIG. 3 in the unfolded state. While the two parts 50 and 76 are rigid and allow for the desired mechanical strength, the film hinge 52 is made of the same plastic in a way known per se, but so thin that it forms a hinge function.

In the exemplary embodiment illustrated the molded part 12 is made of one piece and may be produced accordingly in one piece as an injection-molded part.

Figure 4:
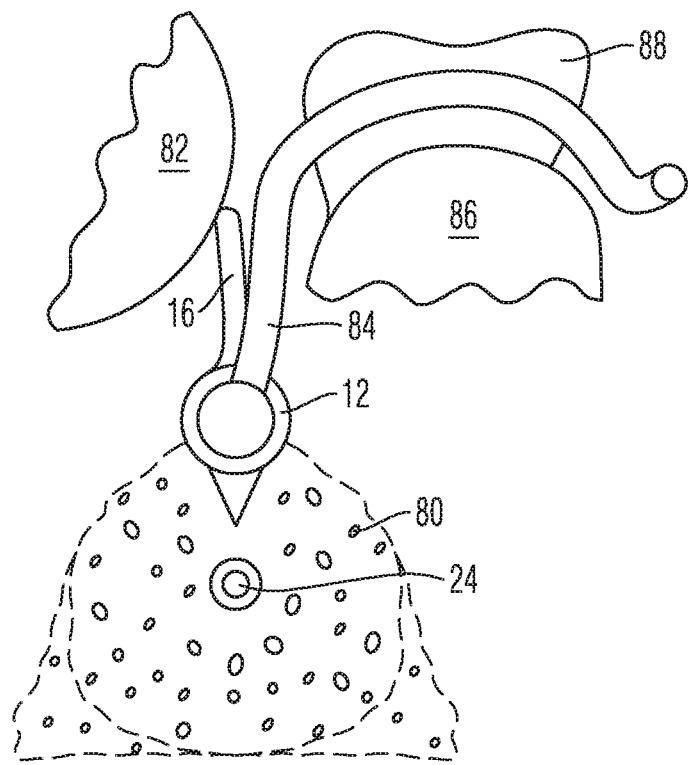
FIG. 4 shows a schematic sectional view from the mesial side through the position and arrangement of the inventive suction device in another embodiment in the mouth of a patient.

It is apparent from FIG. 4 how a suction sponge 80 surrounds the lower U-leg 24 of the molded part 12. In the exemplary embodiment illustrated, the suction sponge 80 is substantially trapezoidal, wherein it is to be understood that any other shapes are also possible. It extends up to the upper U-leg 20 from which a retaining mandrel 40 points towards the bottom. The retaining mandrel 40 engages the suction sponge 80 and fixes it against removal.

As is apparent, the tongue protection 16 keeps a schematically illustrated tongue 82 of a patient away laterally.

The illustration according to FIG. 4 is shown from distally to mesially, and a suction hose 84 is inserted in a connection 14 of the molded part 12. The suction hose 84 runs initially further to the distal side and is then bent towards the top such that the suction hose 84 above the alveolar ridge 86 may cross the alveolar ridge 86 distally at the rearmost molar 88. In the vestibular region the suction hose 84 is redirected towards the mesial side such that it may leave the mouth of the patient.

Figure 5:
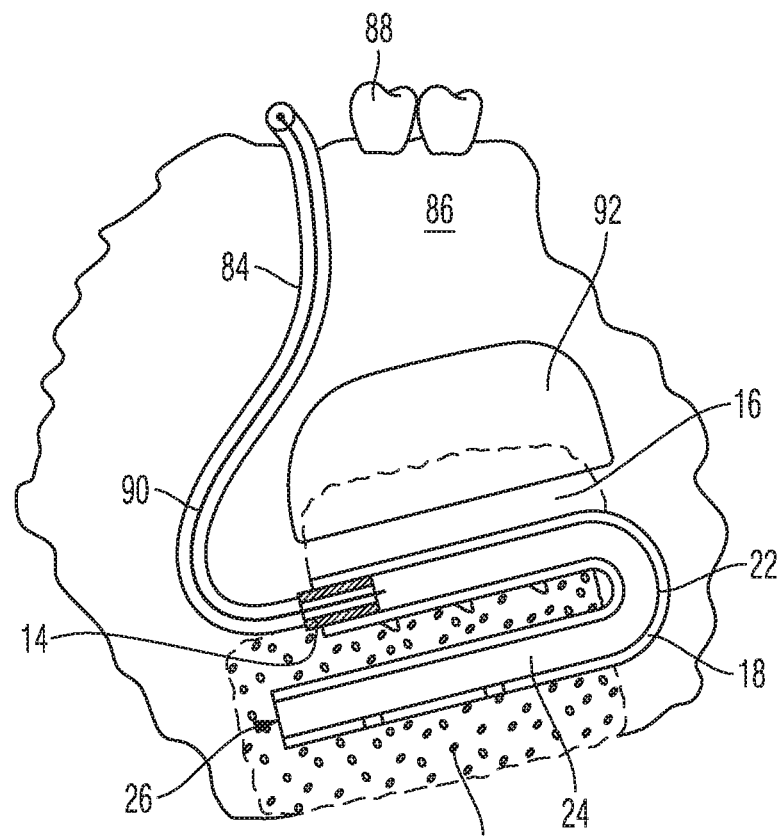
FIG. 5 shows a further embodiment of an inventive molded part, illustrated in the mouth of a patient, when viewed from the oral side.

The illustrated shape of the suction hose 84 is ensured by means of a shape-holding wire 90 which is illustrated as a shape-holding wire 90 in FIG. 5 but which is not illustrated in FIG. 4.

It is further apparent from FIG. 5 that in another embodiment the suction sponge 80 may run substantially cylindrically. An end suction opening 26 of the suction tube 18 is covered by the suction sponge 80. In this embodiment, only at the upper U-leg 20 of the suction tube 18 retaining mandrels 40 are realized which engage the suction sponge 80 and fix it.

In this embodiment the tongue protection 16 is slightly extended by a soft cap 92. It comprises substantially the same stiffness as the molded part 12 as for the rest, but has a softer surface appearance or finish which is perceived to be pleasant by the patient.

By means of lands and grooves which are not illustrated the cap 92 is connected with the rest of the molded part 12 undetachably; the connection may be realized purposefully by injection molding in the injection mold.

As is apparent, in this embodiment the suction tube 18 extends in a slightly tapered fashion to the end suction opening 26, i.e. with a decreasing internal diameter. Tapering is effected such that the flow rate is high at the end suction opening 26 which favors absorption of liquids at the lowest intraoral position in the mouth of the patient.

Figure 6:
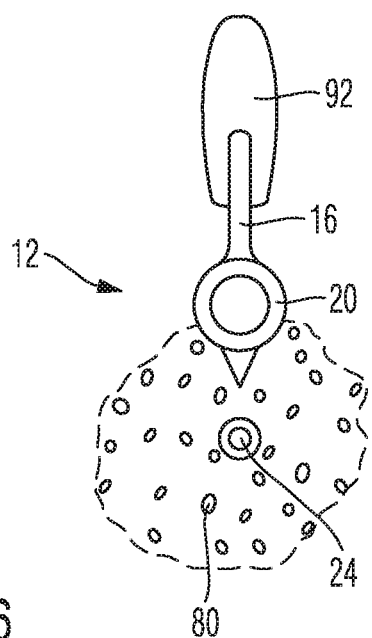
FIG. 6 shows a section through the embodiment according to FIG. 5.

It is apparent from FIG. 6 how the embodiment according to FIG. 5 is illustrated in a mesially/distally extending section. It is apparent that the suction sponge 80 has a substantially larger width than the molded part 12. The height of the molded part 12 including the tongue protection 16 is considerably larger than the diameter of the suction hose 84 such that a good suction effect is achieved on the one hand, and the tongue protection 16 keeps away the tongue of the patient from the treatment area on the other hand.

Figure 7:
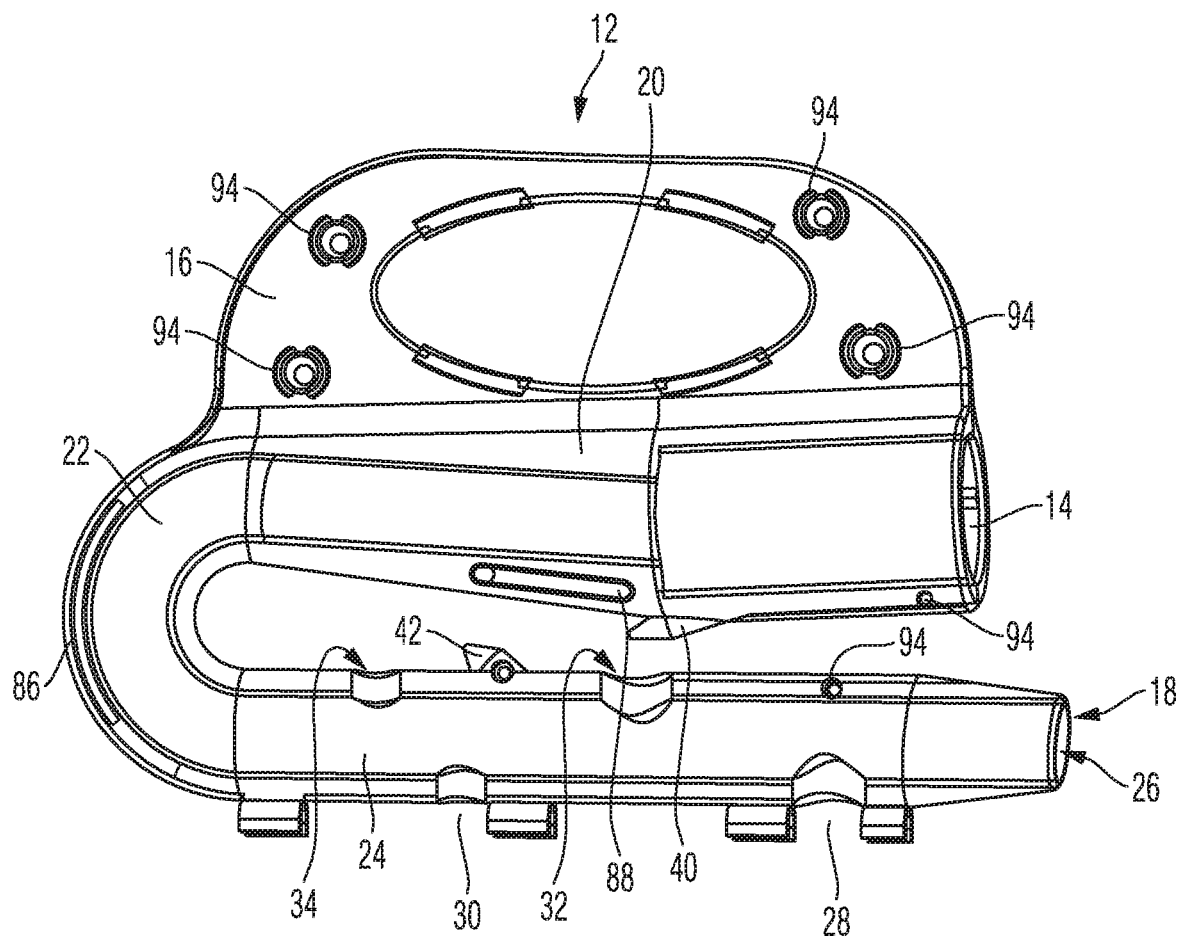
FIG. 7 shows a perspective illustration of a part of the inventive intraoral suction device, namely the molded part in another embodiment.

FIG. 7 shows a slightly modified embodiment compared to the solution according to FIG. 1. Additional anchoring elements 86 and 88 are provided, namely at the U-shaped central portion 22 and at the upper U-leg 20, directly adjacent to the connection 14.

They are configured in an elongated fashion and extend along the suction tube 18.

In addition, numerous snap-fits 94 are arranged in a distributed fashion. Among others, two snap-fits 94 are provided adjacent to the connection 18. They keep the parts 50 and 76 pretensioned to one another in this area such that the suction hose 84 is held undetachably in the connection 18.

The invention claimed is:

1. A suction device for intraoral use comprising
a suction line and a tongue protection,
the suction line being bent substantially U-shaped,
wherein the suction line, as a suction tube (18), and the tongue protection (16) are configured integrally with one another as a molded part (12),
wherein the suction tube (18) comprises a connection (14) for a suction hose (84), which connection (14)) points mesially,
wherein the connection (14) is adjoined by an upper U-leg (20), a mesial, U-central portion (22) and a lower U-leg (24), said U-legs extending away from the U-central portion (22) in a distally horizontal direction,
wherein the lower U-leg (24) comprises suction openings and is surrounded by a suction sponge (80) extending around the lower U-leg (24) and covering the suction openings, and
wherein the suction tube (18) at the distal end of the lower U-leg (24) terminates in an end suction opening (26) which is covered by the suction sponge (80).

2. The suction device as claimed in claim 1,
wherein the molded part (12) is produced from plastic in a molding process comprising injection-molding or in an additive process comprising rapid prototyping.

3. The suction device as claimed in claim 1,
wherein the suction sponge (80) extends to the upper U-leg (20) and abuts and pushes against the upper U-leg (20) and partially surrounds the upper U-leg (20).

4. The suction device as claimed in claim 1,
wherein the suction sponge (80) comprises a greater width than the molded part (12), and/or
wherein the height of the molded part (12) is larger than a diameter of the suction sponge.

5. The suction device as claimed in claim 4,
wherein the suction sponge (80) comprises a width at least three times the width of the molded part (12).

6. The suction device as claimed in claim 1,
wherein the tongue protection (16) extends adjacent to and above the upper leg (20) of the suction tube (18), and
wherein the molded part (12) forms a tongue-friendly fillet at a transition between the suction tube (18) and the tongue protection (16).

7. The suction device as claimed in claim 1,
wherein the suction openings (28, 30, 32, 34) are distributed around on a periphery of the lower U-leg (24) of the suction tube (18), of which at least one of the suction openings points to the bottom thereof, and
wherein the upper U-leg (20) is free from suction openings (28, 30, 32, 34).

8. The suction device as claimed in claim 1,
wherein at least one suction opening is adjacent to the central portion (22) and comprises a smaller cross-sectional area than a more distal suction opening of the suction openings.

9. The suction device as claimed in claim 1,
wherein the end suction opening (26) extends over the distal front face of the suction line.

10. The suction device as claimed in claim 1,
wherein the suction line tapers at the distal end of the lower U-leg (24) in a nozzle-shaped manner at the end.

11. The suction device as claimed in claim 1,
wherein at least one suction opening which is configured at the lower U-leg (24) points to the upper U-leg (20).

12. The suction device as claimed in claim 1,
wherein the suction sponge (80) extends substantially over the entire length of the lower U-leg (24) extending over at least 70% of the entire length, and surrounds the lower U-leg (24) and comprises a substantially trapezoidal cross-section.

13. The suction device as claimed in claim 1,
wherein a retaining mandrel (40, 42) is configured at the lower U-leg (24) of the suction line and points in the mesial direction and engages the suction sponge (80) from the inside, and/or
wherein a retaining mandrel (40, 42) is provided at the upper U-leg (20) which mandrel points to the lower U-leg (24) and is oriented mesially and engages the suction sponge (80) from the outside.

14. The suction device as claimed in claim 1,
wherein the tongue protection (16) extends over substantially the total length extending over more than 70% of the length, of the upper U-leg (20) and runs therefrom to the top opposite the lower U-leg.

15. The suction device as claimed in claim 1,
wherein the suction line is connected to a suction hose at the distal end of the upper U-leg (20) without adhesive.

16. The suction device as claimed in claim 15,
wherein the suction hose comprises a stiffening element that extends therein comprising a wire which is bent to extend starting from the suction line along the alveolar ridge (86) distal to the rearmost molar (88) over the alveolar ridge (86) to the vestibular side, and guides the suction hose over this course to the extraoral side.

17. The suction device as claimed in claim 1,
wherein the molded part (12) comprises at least two parts which fix the suction hose in a clamping manner when they are joined on top of one another.

18. The suction device as claimed in claim 17,
wherein the parts are connected to one another pivotally by a film hinge (52),
wherein the film hinge (52) is configured below the lower U-leg (24).

19. The suction device as claimed in claim 17,
wherein the parts (50, 76) are connected with one another by means of anchoring elements which fix the parts (50, 76) to one another in an engaged manner.

20. The suction device as claimed in claim 19,
wherein in the region of the tongue protection (16), one part (50, 76) snaps into the other part and penetrates it to form a substantially flush surface.

* * * * *